United States Patent
Abe

(10) Patent No.: US 9,719,233 B1
(45) Date of Patent: Aug. 1, 2017

(54) CONSTRUCTION MACHINE

(71) Applicant: Hitachi Construction Machinery Co., Ltd., Taito-ku, Tokyo (JP)

(72) Inventor: Shinya Abe, Tsuchiura (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 0 days.

(21) Appl. No.: 15/258,039

(22) Filed: Sep. 7, 2016

(30) Foreign Application Priority Data

Jan. 29, 2016 (JP) .................................. 2016-15514

(51) Int. Cl.
| | |
|---|---|
| *E02F 9/08* | (2006.01) |
| *E02F 9/18* | (2006.01) |
| *E02F 9/16* | (2006.01) |
| *E02F 9/12* | (2006.01) |
| *B60K 13/04* | (2006.01) |
| *F01N 3/20* | (2006.01) |
| *F01N 3/28* | (2006.01) |
| *E02F 3/32* | (2006.01) |

(52) U.S. Cl.
CPC ............ *E02F 9/0866* (2013.01); *B60K 13/04* (2013.01); *E02F 9/0883* (2013.01); *E02F 9/121* (2013.01); *E02F 9/16* (2013.01); *E02F 9/18* (2013.01); *F01N 3/2066* (2013.01); *F01N 3/2896* (2013.01); *E02F 3/32* (2013.01); *F01N 2610/02* (2013.01); *F01N 2610/1433* (2013.01); *F01N 2610/1453* (2013.01); *F01N 2610/1473* (2013.01)

(58) Field of Classification Search
CPC ....... E02F 9/0866; E02F 9/0883; E02F 9/121; E02F 9/16; E02F 9/18; E02F 3/32; B60K 13/04; F01N 3/2066; F01N 3/2896; F01N 2610/1433; F01N 2610/1453; F01N 2610/1473; F01N 2610/02
USPC ........................................................ 180/309
See application file for complete search history.

(56) References Cited

U.S. PATENT DOCUMENTS

| | | | | |
|---|---|---|---|---|
| 7,775,036 | B2 * | 8/2010 | Barcin ................... | B01D 53/79 60/274 |
| 8,186,156 | B2 * | 5/2012 | Kamiya ............. | B01D 53/9431 180/305 |
| 8,459,014 | B2 * | 6/2013 | Kamiya ................. | B60K 13/04 60/295 |

(Continued)

FOREIGN PATENT DOCUMENTS

JP 2015-105590 A 6/2015

*Primary Examiner* — Hau Phan
*Assistant Examiner* — Jacob Meyer
(74) *Attorney, Agent, or Firm* — Crowell & Morning LLP

(57) ABSTRACT

An exhaust pipe (7A) in an engine (7) is provided with an exhaust gas purifying device (10) with a urea selective reduction catalyst (13A) removing nitrogen oxides in an exhaust gas. The exhaust gas purifying device (10) is provided with a urea water injection valve (14) that injects urea water as a reducing agent to the upstream side of the urea selective reduction catalyst (13A). The urea water injection valve (14) is connected to a urea water tank (22) through a urea water pump (25). The urea water pump (25) is arranged in an upper side to the urea water tank (22). A return conduit line (30) in which the urea water flows from the urea water pump (25) toward the urea water tank (22) is disposed in an upper-lower direction between the urea water pump (25) and the urea water tank (22).

2 Claims, 5 Drawing Sheets

(56) References Cited

U.S. PATENT DOCUMENTS

| | | | | |
|---|---|---|---|---|
| 8,661,785 B2* | 3/2014 | Levin | .................... | F01N 3/208 60/274 |
| 8,672,082 B2* | 3/2014 | Kashu | ................... | B60K 13/04 180/309 |
| 8,973,692 B1* | 3/2015 | Okuda | ............... | B60L 11/1877 180/68.5 |
| 9,003,779 B2* | 4/2015 | Kanamori | ............... | F01N 3/208 60/295 |
| 9,194,104 B2* | 11/2015 | Kanamori | ................ | B60R 3/00 |
| 9,410,306 B2* | 8/2016 | Ozaki | ................... | E02F 9/0866 |
| 9,453,327 B2* | 9/2016 | Okamoto | ............. | E02F 9/0883 |
| 2010/0212297 A1* | 8/2010 | Kamiya | ............ | B01D 53/9409 60/286 |
| 2010/0266458 A1* | 10/2010 | Takeshita | ............. | E02F 9/0866 422/109 |
| 2011/0030349 A1* | 2/2011 | Makartchouk | ........ | F01N 3/2066 60/286 |
| 2014/0196975 A1* | 7/2014 | Hata | .................... | E02F 9/0866 180/309 |
| 2014/0318882 A1* | 10/2014 | Sawada | ................ | B60K 13/04 180/309 |
| 2016/0040577 A1* | 2/2016 | Nihongi | ............... | F01N 3/2066 73/49.5 |
| 2016/0273429 A1* | 9/2016 | Nihongi | ............... | F01N 3/2066 |

\* cited by examiner

CONSTRUCTION MACHINE

TECHNICAL FIELD

The present invention relates to construction machines such as a hydraulic excavator provided with a urea water tank for reserving urea water therein and a urea water pump for delivering the urea water in the urea water tank to an exhaust gas purifying device.

BACKGROUND ART

In general, a hydraulic excavator as a representative example of construction machines is configured with an automotive lower traveling structure, an upper revolving structure that is mounted on the lower traveling structure to be capable of revolving thereon and a front device that is mounted on the upper revolving structure to be capable of tilting and lifting thereto. The front device includes a boom, an arm, a bucket and a plurality of hydraulic actuators composed of a boom cylinder, an arm cylinder and a bucket cylinder that respectively drive these above components, and operates each of the hydraulic actuators, thereby performing an excavating work of earth and sand.

The upper revolving structure is formed as a support structure for being mounted on the lower traveling structure. The upper revolving structure is provided with a revolving frame on which the front device is mounted in the front side to the support structure, a counterweight that is provided in the rear end to the revolving frame for acting as a weight balance to the front device, an engine that is positioned in the front side to the counterweight and is mounted in the rear part of the revolving frame in a horizontal state of extending in the left-right direction, an exhaust gas purifying device that is provided in an exhaust pipe of the engine with a urea selective reduction catalyst removing nitrogen oxides in an exhaust gas, a urea water injection valve that is provided in the exhaust gas purifying device and injects urea water as a reducing agent to the upstream side of the urea selective reduction catalyst, a urea water tank that reserves therein the urea water to be supplied to the urea water injection valve and a urea water pump that delivers the urea water reserved in the urea water tank to the urea water injection valve.

In this case, a suction conduit line, in which the urea water to be suctioned from the urea water tank toward the urea water pump flows, establishes a connection between the urea water tank and the urea water pump. A return conduit line, in which the urea water to be returned from the urea water pump toward the urea water tank flows, establishes a connection between the urea water pump and the urea water tank. Further, a supply conduit line, in which the urea water to be delivered from the urea water pump toward the urea water injection valve flows, establishes a connection between the urea water pump and the urea water injection valve (Patent Document 1).

PRIOR ART DOCUMENT

Patent Document

Patent Document 1: Japanese Patent Laid-Open No. 2015-105590 A

SUMMARY OF THE INVENTION

Incidentally, in a region under a low-temperature environment such as a cold weather region, the urea water reserved in each of the urea water conduit lines and the urea water tank as described above are possibly frozen. As to the conventional technologies, there is known a technology in which heaters (hot wires) are disposed in each of the urea water conduit lines and the urea water tank to unfreeze the frozen urea water. On the other hand, there is known a technology in which at the engine stopping, a valve in the return conduit line side in the urea water pump is closed and the urea water pump is reversely rotated, and thereby, the urea water in the suction conduit line and the urea water in the supply conduit line are returned back to the urea water tank to prevent freezing of the urea water in the conduit lines. However, in the former technology, since the disposition of the heater is necessary, costs increase due to an increase in number of components. On the other hand, in the latter technology, the reverse rotation of the urea water pump enables the urea water in the suction conduit line and in the supply conduit line to be returned back to the urea water tank, but the urea water in the return conduit line cannot be returned back to the urea water tank, and results in remaining in the return conduit line.

A residual amount of the urea water remaining in the return conduit line after reversely rotating the urea water pump is possibly frozen for a short time since it is smaller in comparison with a reserved amount of the urea water in the urea water tank. When the urea water pump is normally rotated in a state where the urea water in the return conduit line is frozen, the urea water cannot smoothly circulate in each of the conduit lines, thereby creating a possibility that purification treatment control of an exhaust gas cannot be appropriately performed.

The present invention is made in view of the aforementioned problems in the conventional technologies, and an object of the present is to provide a construction machine that can suppress urea water from remaining in a return conduit line.

For solving the aforementioned problems, a construction machine according to the present invention comprises: an automotive vehicle body on which a front device is provided; an engine that is mounted on the vehicle body; an exhaust gas purifying device that is provided in an exhaust pipe in the engine with a urea selective reduction catalyst removing nitrogen oxides in an exhaust gas; a urea water injection valve that injects urea water as a reducing agent to the upstream side of the urea selective reduction catalyst; a urea water tank that reserves therein the urea water to be supplied to the urea water injection valve; a urea water pump that delivers the urea water reserved in the urea water tank to the urea water injection valve; a suction conduit line that is provided for connection between the urea water tank and the urea water pump and in which the urea water to be suctioned from the urea water tank toward the urea water pump flows; a return conduit line that is provided for connection between the urea water pump and the urea water tank and in which the urea water to be returned from the urea water pump toward the urea water tank flows; and a supply conduit line that is provided for connection between the urea water pump and the urea water injection valve and in which the urea water to be delivered from the urea water pump toward the urea water injection valve flows, wherein the urea water pump is arranged in an upper side to the urea water tank, and the return conduit line is disposed in an upper-lower direction between the urea water pump and the urea water tank.

According to the present invention, it is possible to suppress the urea water from being frozen in the return conduit line for connection between the urea water tank and the urea water pump, and finally, reliability and stability on the purification treatment device of the exhaust gas can be improved.

MODE FOR CARRYING OUT THE INVENTION

Hereinafter, a construction machine according to an embodiment in the present invention will be in detail explained with reference to FIG. 1 to FIG. 5, by taking a wheel type hydraulic excavator as a representative example.

Figure 1:
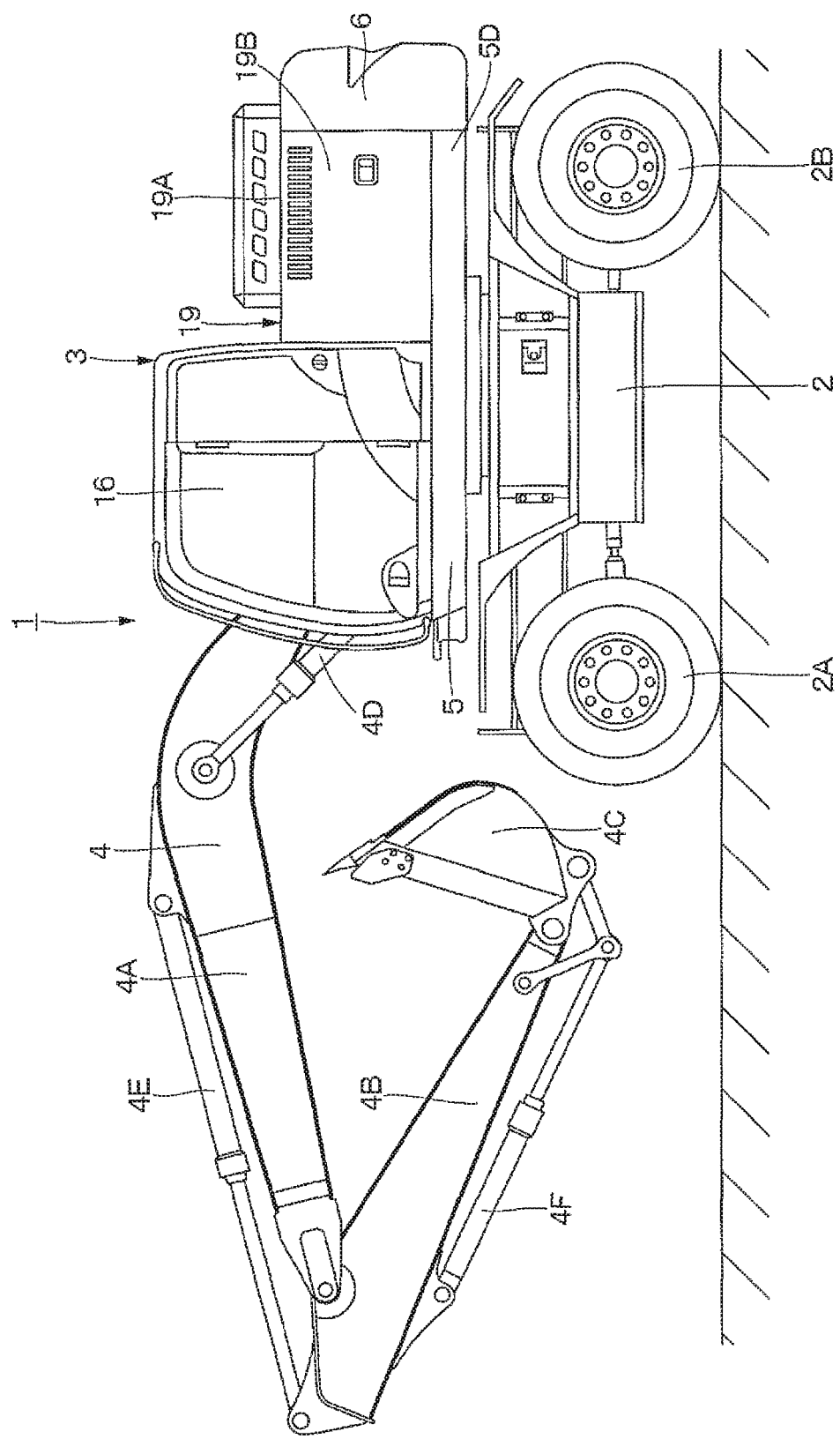
FIG. 1 is a front view showing a hydraulic excavator according to an embodiment in the present invention.

In FIG. 1, a hydraulic excavator 1 is a wheel type hydraulic excavator that is provided with an automotive wheel type lower traveling structure 2 (vehicle body) with left and right front wheels 2A and left and right rear wheels 2B. The hydraulic excavator 1 includes an upper revolving structure 3 (vehicle body) that is mounted on the lower traveling structure 2 to be capable of revolving thereon and a front device 4 that is provided on the upper revolving structure 3 to be capable of lifting and tilting thereto. In this case, the hydraulic excavator 1 is configured such that a minimum revolving radius of the front device 4 from a revolving center of the upper revolving structure 3 and a rear end revolving radius from the revolving center to a rear end of a counterweight 6 have substantially the same dimension. Such a hydraulic excavator 1 is called a so-called small-revolving type hydraulic excavator.

Figure 2:
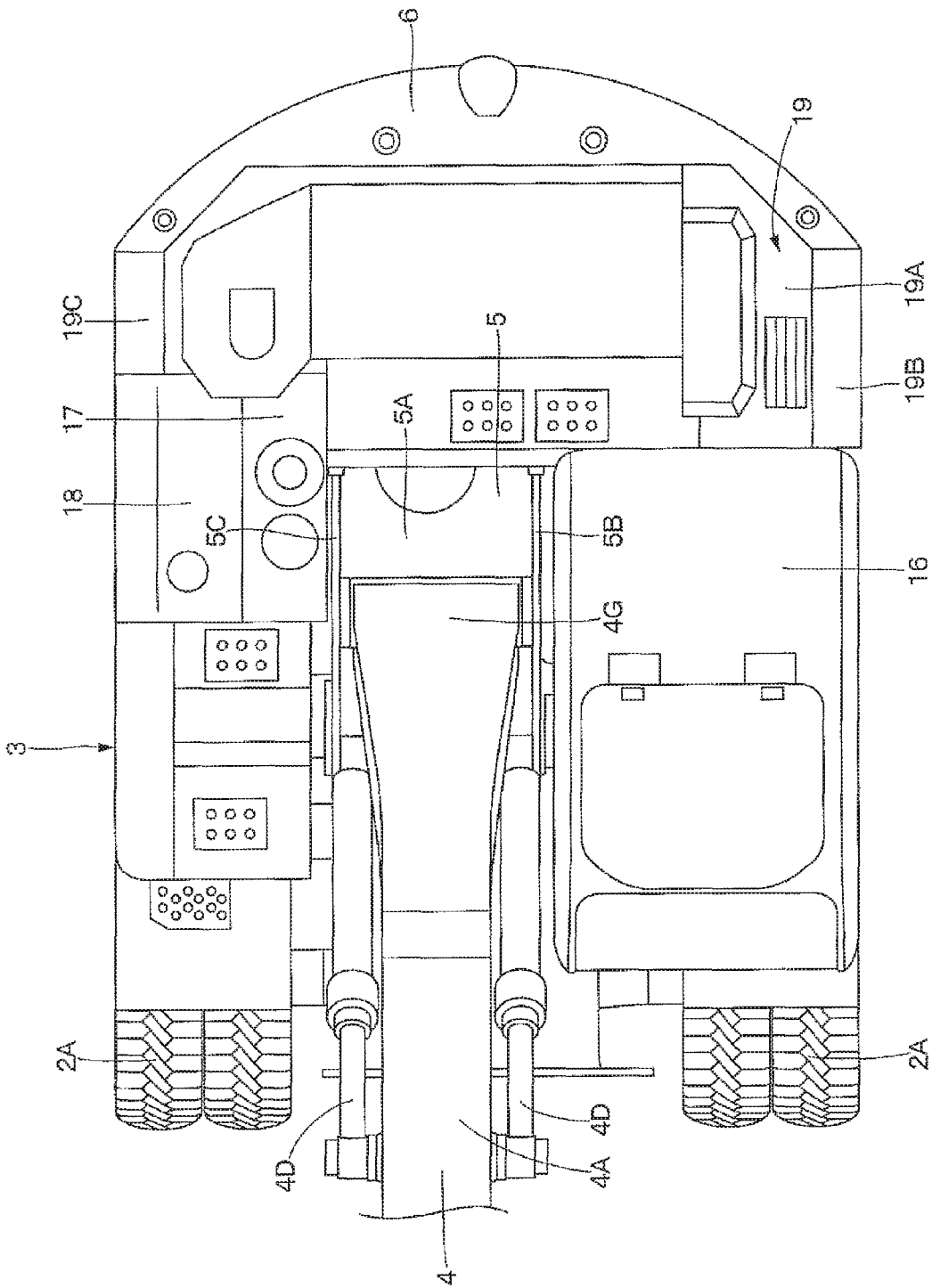
FIG. 2 is a plan view enlarging and showing the hydraulic excavator with a front device being partially omitted.

The front device 4 includes a boom 4A, an arm 4B, a bucket 4C, a boom cylinder 4D, an arm cylinder 4E, a bucket cylinder 4F and the like. As shown in FIG. 2, a foot part 4G of the boom 4A is rotatably mounted in the front side to the after-mentioned revolving frame 5 and in an intermediate part thereof in the left-right direction.

Figure 3:
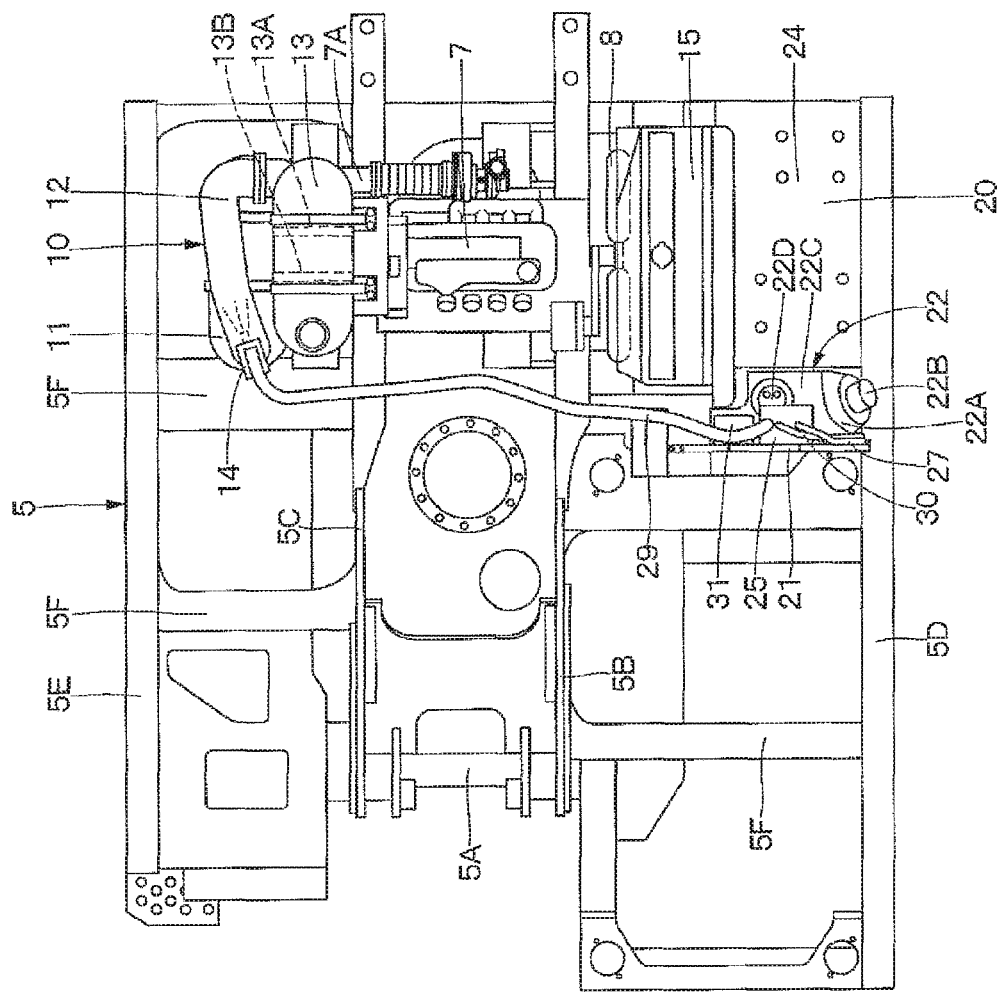
FIG. 3 is a plan view showing a revolving frame, an engine, a heat exchanger, an exhaust gas purifying device, a urea water tank, a urea water pump, a suction conduit line, a return conduit line, a supply conduit line and the like with an air cleaner being omitted.

The revolving frame 5 is formed as a support structure of the upper revolving structure 3, in the front side to which the foot part 4G of the front device 4 is mounted, and is mounted on the lower traveling structure 2 to be capable of revolving thereon. As shown in FIG. 3, the revolving frame 5 includes a bottom plate 5A composed of a thick steel plate extending in the front-rear direction and the like, a left vertical plate 5B and a right vertical plate 5C that are provided to rise on the bottom plate 5A and extend in the front-rear direction at a predetermined interval in a left-right direction, a left side frame 5D and a right side frame 5E that are respectively arranged at an interval on the left to the left vertical plate 5B and at an interval on the right to the right vertical plate 5C and extend in the front-rear direction, and a plurality of extension beams 5F that respectively extend in the left-right direction from the bottom plate 5A and the respective vertical plates 5B, 5C and support the left side frame 5D and the right side frame 5E at the distal ends, respectively. The front device 4 (foot part 4G) is mounted to the front side to each of the vertical plates 5B, 5C to be capable of tilting and lifting thereto, and the counterweight 6 to be described later is mounted to the rear side.

The counterweight 6 is mounted on rear ends of the left and right vertical plates 5B, 5C forming the revolving frame 5. The counterweight 6 acts as a weight balance to the front device 4. Here, since the hydraulic excavator 1 is a small-revolving type hydraulic excavator, the counterweight 6 is arranged in a position near the revolving center of the upper revolving structure 3. Following this arrangement, a rear surface of the counterweight 6 is formed in a substantially arc shape around the revolving center of the upper revolving structure 3 (refer to FIG. 2).

An engine 7 is provided on the rear part of the revolving frame 5 to be positioned in the front side to the counterweight 6. As shown in FIG. 3, the engine 7 is mounted in a horizontal state of extending in the left-right direction. A cooling fan 8 is arranged in the left side as one side in the left-right direction to the engine 7 to suction external air as cooling air. On the other hand, a hydraulic pump (not shown) is arranged on the right side as the other side in the left-right direction to the engine 7 to be positioned under an exhaust gas purifying device 10 to be described later. The hydraulic pump is driven by the engine 7, thereby delivering pressurized oil toward various hydraulic actuators provided in the upper revolving structure 3 and the front device 4.

In addition, an unillustrated intake pipe is connected to the intake side of the engine 7, and an air cleaner 9 is mounted on the distal side of the intake pipe. The air cleaner 9 is disposed in a heat exchanger upstream room 20 to be described later, and separates dusts in the suctioned air by centrifugation, causing only the cleansed air to flow into the engine 7. On the other hand, an exhaust pipe 7A is connected to the exhaust side of the engine 7.

The exhaust gas purifying device 10 is provided in the exhaust pipe 7A of the engine 7. The exhaust gas purifying device 10 is positioned on the right side to the engine 7 and is disposed in an upper side to the hydraulic pump. The exhaust gas purifying device 10 removes harmful substances in the exhaust gas discharged from the engine 7. In addition, the exhaust gas purifying device 10 is provided with a muffler mechanism for reducing noises of the exhaust gas. The exhaust gas purifying device 10 includes a first exhaust gas post-treatment device 11, a connecting conduit line 12 and a second exhaust gas post-treatment device 13.

The first exhaust gas post-treatment device 11 is connected to the outlet side of the exhaust pipe 7A. The first exhaust gas post-treatment device 11 is formed of a cylindrical body extending in the front-rear direction, and is disposed in the upper side to the hydraulic pump and in a lower side to the second exhaust gas post-treatment device 13 to be described later. An oxidation catalyst (not shown) formed of, for example, a cell-shaped cylindrical body made of a ceramic is provided inside the first exhaust gas post-treatment device 11.

The oxidation catalyst has many through holes formed axially, and an inner surface coated with noble metal. The oxidation catalyst causes an exhaust gas to flow in the through holes at a predetermined temperature, thereby oxidizing carbon monoxides (CO), hydrocarbons (HC) and the like contained in the exhaust gas to be removed. In addition, the oxidation catalyst burns and removes particulate matter (PM) as needed.

The connecting conduit line 12 is disposed to extend in the front-rear direction above the first exhaust gas post-treatment device 11. The connecting conduit line 12 is provided for connection between the first exhaust gas post-treatment device 11 and the second exhaust gas post-treatment device 13. Specifically, the connecting conduit line 12 is connected to a front end side (downstream side in the flow direction of the exhaust gas) of the first exhaust gas post-treatment device 11 and a rear end side (upstream side in the flow direction of the exhaust gas) of the second exhaust gas post-treatment device 13. Further, a urea water injection valve 14 to be described later is provided in a front end side (upstream side in the flow direction of the exhaust gas) of the connecting conduit line 12.

The second exhaust gas post-treatment device 13 is arranged on the left and upper side to the first exhaust gas post-treatment device 11. The second exhaust gas post-treatment device 13 is connected to the outlet side of the connecting conduit line 12, and is formed of a cylindrical body extending in the front-rear direction in parallel with the first exhaust gas post-treatment device 11. A urea selective reduction catalyst 13A and an oxidation catalyst 13B are disposed in the second exhaust gas post-treatment device 13 (refer to FIG. 3).

The urea selective reduction catalyst 13A is formed of, for example, a cell-shaped cylindrical body made of a ceramic, and has many through holes formed axially and an inner surface coated with noble metal. The urea selective reduction catalyst 13A reduces nitrogen oxides (NOx) contained in an exhaust gas discharged from the engine 7 by ammonia generated from the urea solution, thus decomposing the nitrogen oxides (NOx) into nitrogen and water.

The oxidation catalyst 13B is provided downstream of the urea selective reduction catalyst 13A in the flow direction of an exhaust gas. The oxidation catalyst 13B is, as substantially similar to the aforementioned first exhaust gas post-treatment device 11, formed of a cell-shaped cylindrical body made of a ceramic, and has many through holes formed axially and an inner surface coated with noble metal. With this configuration, the oxidation catalyst 13B oxidizes the residual ammonia remaining after reduction of the nitrogen oxides by the urea selective reduction catalyst 13A, thus decomposing the ammonia into nitrogen and water.

The urea water injection valve 14 is provided in the front end side of the connecting conduit line 12. The urea water injection valve 14 is connected to an after-mentioned urea water tank 22 reserving therein the urea solution through a suction conduit line 27, a urea water pump 25 and a supply conduit line 29. The urea water injection valve 14 injects urea water as a reducing agent to an exhaust gas flowing in the connecting conduit line 12 to the upstream side of the urea selective reduction catalyst 13A.

A heat exchanger 15 is arranged to face a cooling fan 8 to be positioned in the upstream side in the flow direction of cooling air by the cooling fan 8. The heat exchanger 15 includes, for example, a radiator for cooling engine cooling water, an oil cooler for cooling hydraulic oil, an intercooler for cooling air to be suctioned by the engine 7 and the like. The heat exchanger 15 is covered with an after-mentioned housing 19 together with the engine 7, the hydraulic pump and the like.

A cab 16 is mounted on the revolving frame 5 to be positioned in the left side across the foot part 4G of the front device 4. The cab 16 is provided for an operator to get in, and accommodates therein an operator's seat on which the operator sits, a traveling lever, a working operating lever and the like (none is shown). Further, key switches (not shown) for controlling an on/off operation of an electrical system in the hydraulic excavator 1, a start/stop operation of the engine 7 and the like are disposed near the operator's seat.

A hydraulic oil tank 17 is provided on the revolving frame 5 to be positioned in the front side to the engine 7 and in the right side across the foot part 4G in the front device 4. The hydraulic oil tank 17 reserves therein hydraulic oil to be supplied to the various actuators mounted on the hydraulic excavator 1. On the other hand, a fuel tank 18 is provided on the revolving frame 5 to be adjacent in the right side to the hydraulic oil tank 17. The fuel tank 18 reserves therein fuel to be supplied to the engine 7.

A housing 19 is provided on the revolving frame 5 to be positioned in the rear side to the upper revolving structure 3. The housing 19 is positioned between the counterweight 6, the cab 16, the hydraulic oil tank 17 and the fuel tank 18, and covers onboard equipment including the engine 7, the heat exchanger 15 and the like. The housing 19 includes an upper surface cover 19A for covering the upper side of the engine 7, the heat exchanger 15 and the like, a left side cover 19B rising down to face the heat exchanger 15 from the left end of the upper surface cover 19A, and a right side cover 19C rising down from the right end of the upper surface cover 19A.

The left side cover 19B is disposed on one face in the left-right direction of the revolving frame 5, that is, the left side frame 5D, and can open/close using the front part as a fulcrum, for example. That is, the left side cover 19B is mounted to an after-mentioned partition plate 21 through a hinge (not shown), thereby closing the left side of an after-mentioned heat exchanger upstream room 20 to be capable of opening/closing.

The heat exchanger upstream room 20 is provided between the cab 16 and the counterweight 6. That is, the heat exchanger upstream room 20 is provided upstream of the heat exchanger 15 in the flow direction of cooling air supplied to the heat exchanger 15. The heat exchanger upstream room 20 is a space surrounded by the housing 19, the after-mentioned partition plate 21 and the counterweight 6.

Figure 4:
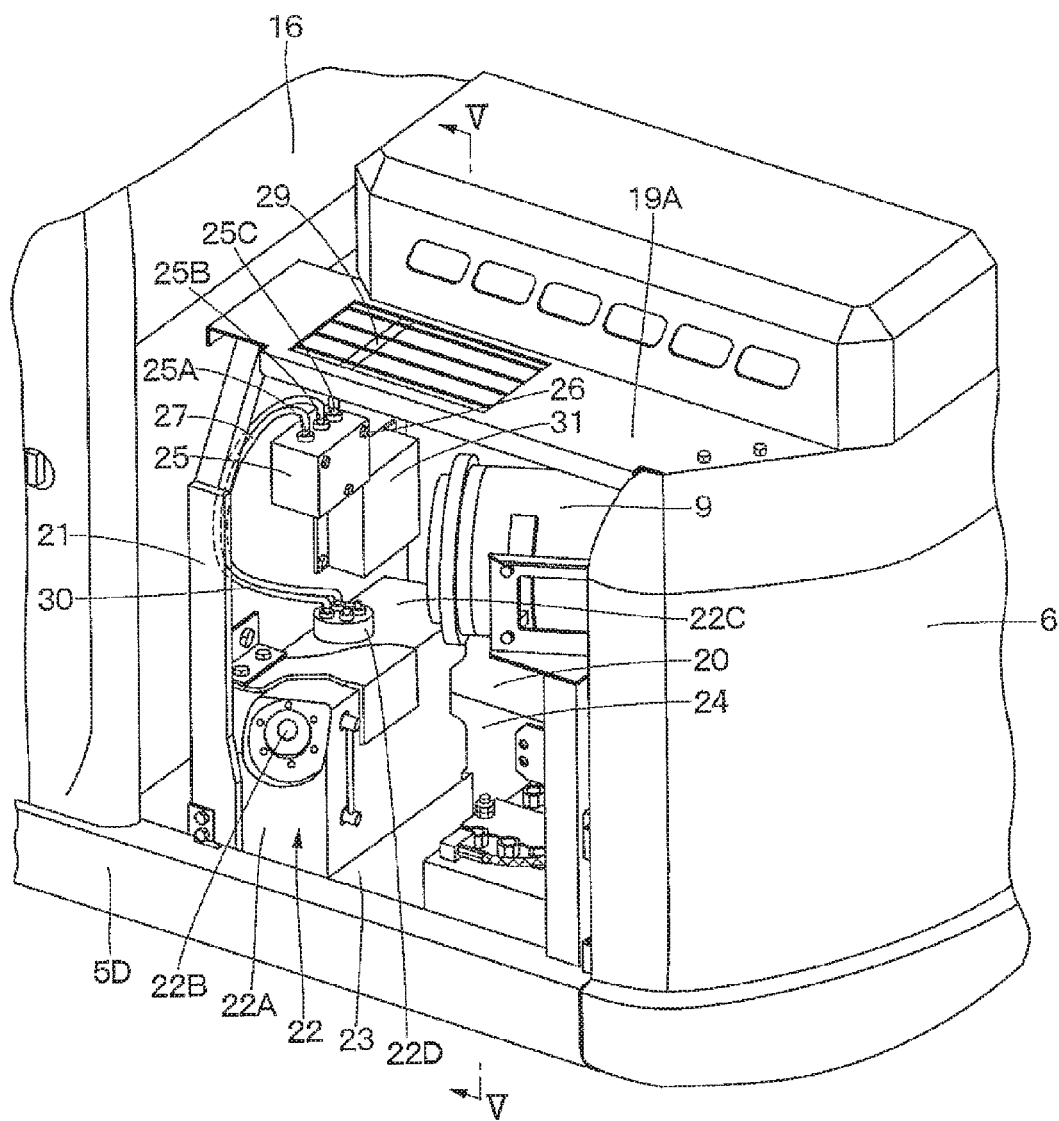
FIG. 4 is a perspective view showing a cab, a counterweight, a partition plate, the urea water tank, the urea water pump, the suction conduit line, the return conduit line, the supply conduit line and the like as viewed from the left and backward side with a left side cover being removed.

Specifically, the heat exchanger upstream room 20 is configured such that the upper side is closed by the upper surface cover 19A of the housing 19, the front side is closed by the partition plate 21 and the rear side is closed by the counterweight 6. The left side of the heat exchanger upstream room 20 is closed by the left side cover 19B to be capable of opening/closing. On the other hand, the heat exchanger 15 is disposed on the right side to the heat exchanger upstream room 20. Further, as shown in FIG. 4, the air cleaner 9 is arranged in the heat exchanger upstream room 20.

The partition plate 21 is a partition between the heat exchanger upstream room 20 and the cab 16. The partition plate 21 is provided to rise on the revolving frame 5 to be positioned between the front part of the heat exchanger 15 and the rear surface of the cab 16 and extend in the left-right direction. The partition plate 21 prevents heat, noises and the like from the engine 7 from being transmitted into the cab 16.

Figure 5:
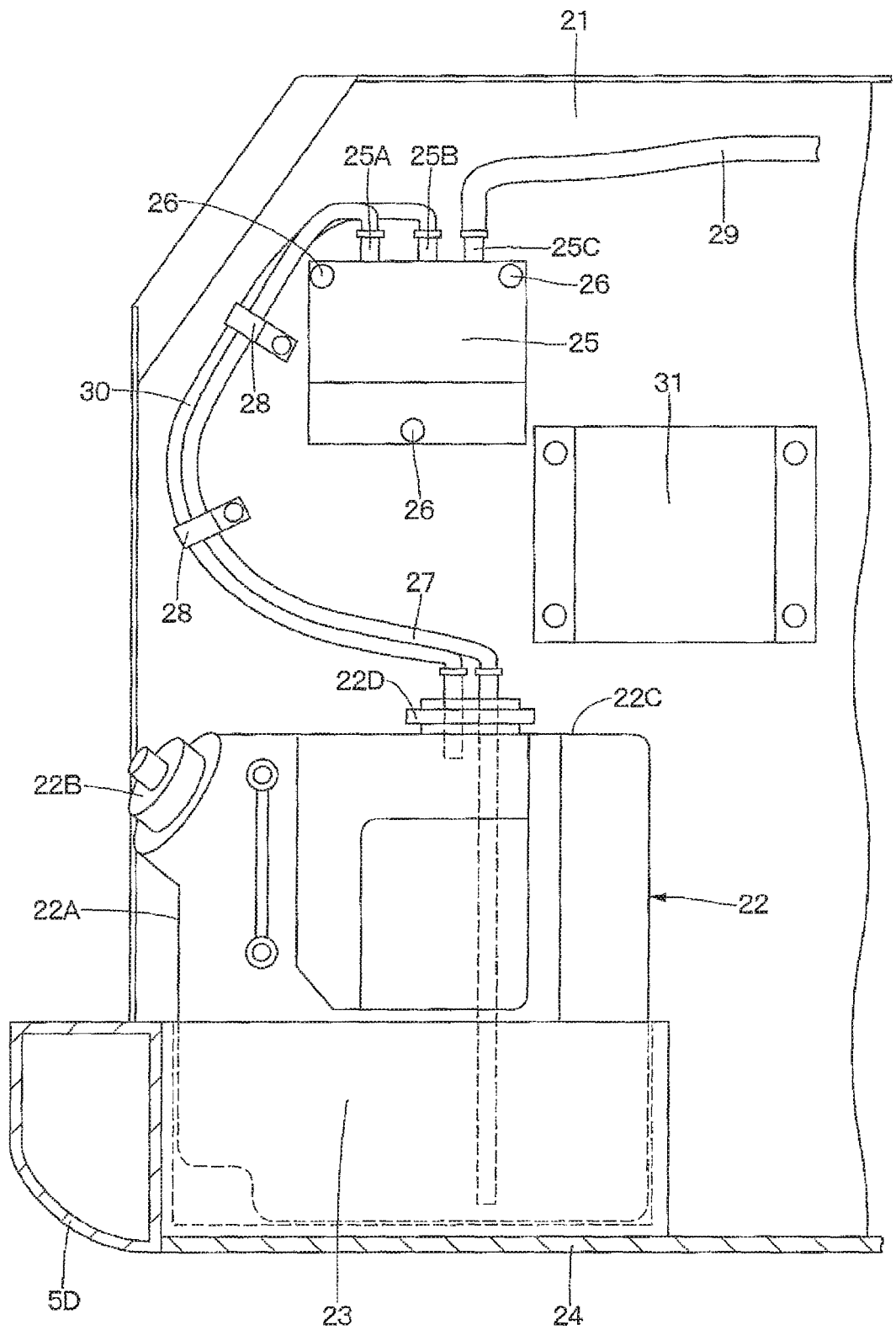
FIG. 5 is a cross sectional view showing the partition plate, the urea water tank, the urea water pump, the suction conduit line, the return conduit line, the supply conduit line and the like as viewed in a direction of arrows V-V in FIG. 4.

The urea water tank 22 is provided on the revolving frame 5 to be positioned in the heat exchanger upstream room 20. The urea water tank 22 reserves therein urea water to be supplied to the urea water injection valve 14 provided in the connecting conduit line 12 in the exhaust gas purifying device 10. The urea water tank 22 is accommodated in a tank receiver 23 and is disposed on the front side to the heat exchanger upstream room 20. That is, as shown in FIG. 3 to FIG. 5, the urea water tank 22 is mounted adjacent to the partition plate 21 on an undercover 24 closing the heat exchanger upstream room 20 from the lower side.

A water supply port 22B for supplying urea water is provided on an upper end side in a left plate 22A of the urea water tank 22. Therefore, the urea water can be easily supplied from the water supply port 22B of the urea water tank 22 by opening the left side cover 19B.

In addition, a lid member 22D is provided on an upper plate 22C of the urea water tank 22. A suction conduit line 27 and a return conduit line 30, which will be described later, are connected to the lid member 22D. In addition, the lid member 22D is provided with, for example, a level gauge (not shown) for measuring a liquid amount of the urea water in the urea water tank 22, a heater (not shown) for unfreezing the urea water in the urea water tank 22, and the like.

The urea water pump 25 is arranged in an upper side to the urea water tank 22 in the heat exchanger upstream room 20. Specifically, the urea water pump 25 is arranged near the urea water tank 22 above the urea water tank 22, and is mounted to the partition plate 21 by three bolts 26. In other words, as shown in FIG. 3, the urea water pump 25 is mounted to the partition plate 21 to cover a part of the upper plate 22C of the urea water tank 22 in a planar view (as viewed from above).

A suction port 25A, a return port 25B and a supply port 25C are provided on the upper surface of the urea water pump 25 in that order from the left side to be spaced from each other in the left-right direction. The after-mentioned suction conduit line 27 is connected to the suction port 25A, and the after-mentioned return conduit line 30 is connected to the return port 25B. In addition, an after-mentioned supply conduit line 29 is connected to the supply port 25C. Besides, cables (not shown) such as electrical wires, signal lines and the like are connected to the urea water pump 25. The urea water pump 25 delivers the urea water reserved in the urea water tank 22 toward the urea water injection valve 14. The return port 25B is provided with a control valve (not shown) that is opened/closed by a controller 31. The control valve is closed at the time of reversely rotating the urea water pump 25.

The suction conduit line 27 is provided for connection between the urea water tank 22 and the urea water pump 25. The urea water suctioned into the urea water pump 25 from the urea water tank 22 flows in the suction conduit line 27. As shown in FIG. 5, a lower end side of the suction conduit line 27 is connected to the lid member 22D of the urea water tank 22, and extends downward (to the bottom part) in the urea water tank 22. On the other hand, an upper end side of the suction conduit line 27 is connected to the suction port 25A of the urea water pump 25. The suction conduit line 27 is disposed to extend in the upper-lower direction between the urea water tank 22 and the urea water pump 25, and the midway portion thereof is fixed to the partition plate 21 by clamps 28.

The supply conduit line 29 is provided for connection between the urea water pump 25 and the urea water injection valve 14. The urea water delivered toward the urea water injection valve 14 from the urea water pump 25 flows in the supply conduit line 29. As shown in FIG. 3 and FIG. 5, one end side of the supply conduit line 29 is connected to the supply port 25C of the urea water pump 25, and the other end side is connected to the urea water injection valve 14.

Next, an explanation will be made of the return conduit line 30 according to the present embodiment.

The return conduit line 30 is provided for connection between the urea water pump 25 and the urea water tank 22. The urea water returned from the urea water pump 25 toward the urea water tank 22 flows in the return conduit line 30. An upper end side of the return conduit line 30 is connected to the return port 25B of the urea water tank 25. On the other hand, a lower end side of the return conduit line 30 is connected to the lid member 22D of the urea water tank 22, and projects into the urea water tank 22.

As shown in FIG. 5, the return conduit line 30 is arranged along, adjacent to and in parallel with the suction conduit line 27. In addition, the suction conduit line 27 and the return conduit line 30 are together fixed to the partition plate 21 by the clamps 28. Thereby, the return conduit line 30 is disposed to extend in the upper-lower direction between the urea water pump 25 and the urea water tank 22. That is, the urea water pump 25 is arranged above and near the urea water tank 22, and thereby, the return conduit line 30 is disposed to extend in the upper-lower direction wholly between the urea water tank 22 and the urea water pump 25. As a result, at the time of stopping a drive of the urea water pump 25, the urea water in the return conduit line 30 can be returned back into the urea water tank 22 by its own weight. Therefore, it is possible to suppress the urea water from being frozen in the return conduit line 30.

The controller 31 is mounted to the partition plate 21 to be positioned in a right and lower side to the urea water pump 25. The controller 31 is connected to the exhaust gas purifying device 10, the urea water injection valve 14, the urea water tank 22, the urea water pump 25 and the like by unillustrated cables, for example, and performs opening/closing valve control of the urea water injection valve 14 and drive control of the urea water pump 25 and the like in response to an operating state (for example, an exhaust gas amount of the exhaust gas, and the like) of the hydraulic excavator 1.

The hydraulic excavator 1 according to the present embodiment has the aforementioned configuration. Next, an explanation will be made of an operation of the hydraulic excavator 1.

An operator gets in the cab 16 and is seated on an operator's seat. The operator operates a key switch in this state, thereby starting the engine 7 to drive the hydraulic pump. When the hydraulic pump is driven to secure pressurized oil as a power source, the operator performs a traveling accelerator pedal and a handle, thereby making it possible to drive the lower traveling structure 2 and cause the hydraulic excavator 1 to travel forward or backward. On the other hand, the operator who is seated on an operator's seat operates a working operating lever, thus making it possible to tilt and lift the front device 4 to perform an excavating work of earth and sand, and the like.

In this case, an exhaust gas discharged from the engine 7 is purified by the exhaust gas purifying device 10 to be discharged into the atmosphere. Specifically, in the exhaust gas discharged from the engine 7, carbon monoxides (CO), hydrocarbons (HC) and the like contained in the exhaust gas are removed by the first exhaust gas post-treatment device 11. Next, the exhaust gas undergoes hydrolysis by the urea water injected by the urea water injection valve 14 in the connecting conduit line 12 to generate ammonia. Thereafter, nitrogen oxides (NOx) in the exhaust gas are selectively reduced by the ammonia generated from the urea water by the second exhaust gas post-treatment device 13 to be decomposed into nitrogen and water, which are then discharged into the atmosphere.

Next, an explanation will be made of drive control of the urea water pump 25 to be performed by the controller 31.

First, when an operator performs an ON operation of the key switch to start the engine 7, the controller 31 determines a state (freezing, a fill amount and the like) of the urea water in the urea water tank 22. In addition, the controller 31 starts a drive of the urea water pump 25 when it is determined that the state of the urea water has no problem.

When the drive of the urea water pump 25 is started, the urea water in the urea water tank 22 circulates in the suction conduit line 27, the urea water pump 25, and the return conduit line 30. In this case, a part of the urea water flows into the supply conduit line 29 from the urea water pump 25, and is supplied to the urea water injection valve 14.

The controller 31 determines whether or not the urea water is filled in the supply conduit line 29 to cause a pressure in the supply conduit line 29 to reach a predetermined value. When the controller 31 determines that the pressure in the supply conduit line 29 has reached the predetermined value, the controller 31 performs opening/closing valve control in response to an exhaust amount of an exhaust gas or the like. Thereby, the urea water is injected into the exhaust gas flowing in the connecting conduit line 12 in the exhaust gas purifying device 10.

On the other hand, when an operator performs an OFF operation of the key switch to stop the drive of the engine 7, the controller 31 stops the drive of the urea water pump 25. Next, the controller 31 closes the control valve of the return port 25B in the urea water pump 25 and starts a reverse rotation of the urea water pump 25.

As a result, the urea water remaining in the suction conduit line 27 and the supply conduit line 29 is returned back to the urea water tank 22. Accordingly, it is possible to suppress the urea water from remaining in the suction conduit line 27 and the supply conduit line 29 at the vehicle body stopping. Thereafter, the controller 31 stops the reverse rotation of the urea water pump 25 and opens the control valve of the return port 25B to prepare for urea water supply control after the restart of the engine 7. On the other hand, the return conduit line 30 is disposed to extend in the upper-lower direction between the urea water pump 25 and the urea water tank 22. Therefore, the urea water in the return conduit line 30 falls down toward the urea water tank 22 with its own weight after stopping the drive of the urea water pump 25, thus causing the return conduit line 30 to be empty.

Incidentally, in the aforementioned conventional technology, since the return conduit line is disposed to extend in the front-rear direction, the urea water in the return conduit line cannot be possibly returned to the urea water tank at the vehicle body stopping. In this case, for example, when a temperature becomes equal to or less than a urea water freezing point (for example, −11° C.), the urea water becomes frozen. Particularly, the urea water in the return conduit line is possibly frozen for a short time since a remaining amount of the urea water is smaller than a reserved amount of the urea water in the urea water tank.

When the urea water pump is driven in a state where the urea water remaining in the return conduit line is frozen, the urea water cannot smoothly circulate (flow), so that the purification treatment control of the exhaust gas cannot be possibly performed appropriately. In addition, since a volume of the solidified urea water expands, a lifetime of the return conduit line is possibly shortened.

Therefore, in the present embodiment, the urea water pump 25 is arranged in the upper side to the urea water tank 22. The return conduit line 30 is disposed to extend in the upper-lower direction between the urea water pump 25 and the urea water tank 22. As a result, in a case of stopping the drive of the urea water pump 25, the urea water in the return conduit line 30 can be returned back to the urea water tank 22.

That is, when the drive of the urea water pump 25 is stopped, the control valve of the return port 25B is closed and the urea water pump 25 is reversely rotated, thereby making it possible to return the urea water in the supply conduit line 29 and the urea water in the suction conduit line 27 back to the urea water tank 22. As a result, the inside of each of the supply conduit line 29 and the suction conduit line 27 can be made to be empty. Thereafter, the control valve of the return port 25B is opened, thus making it possible to prepare for the next urea water supply control to the urea water injection valve 14. On the other hand, the urea water in the return conduit line 30 can be made to drop into the urea water tank 22 with the own weight of the urea water after stopping the drive of the urea water pump 25. As a result, the inside of the return conduit line 30 can be made to be empty.

Thereby, it is possible to suppress the urea water from remaining in the suction conduit line 27, the supply conduit line 29 and the return conduit line 30. Accordingly, it is possible to suppress the urea water from being frozen in the suction conduit line 27, the supply conduit line 29 and the return conduit line 30, and finally, reliability and stability of the purification treatment control of the exhaust gas can be improved. In addition, since the urea water does not remain in the suction conduit line 27 and the return conduit line 30, for example, it is not necessary to provide heaters and the like in the conduit lines 27, 30, therefore making it possible to reduce costs.

Thus, according to the present embodiment, the urea water pump 25 is arranged in the upper side to the urea water tank 22, and thereby, the return conduit line 30 is disposed in the upper-lower direction between the urea water pump 25 and the urea water tank 22. Therefore, since it is possible to suppress the urea water from remaining in the return conduit line 30, it is possible to suppress the urea water from being frozen in the return conduit line 30, and finally, reliability and stability on the purification treatment control of the exhaust gas can be improved. In addition, since it is possible to suppress the urea water from being frozen and expanding in the return conduit line 30, a lifetime of the return conduit line 30 can improve.

In addition, the suction conduit line 27 and the return conduit line 30 are arranged to be adjacent to each other. Thereby, it is possible to dispose the suction conduit line 27 and the return conduit line 30 in order. In addition, it is possible to improve workability on an operation of disposing the suction conduit line 27 and the return conduit line 30 and a maintenance operation thereof.

In addition, the urea water tank 22 and the urea water pump 25 are disposed in the heat exchanger upstream room 20. Therefore, the left side cover 19B is opened, thereby making it possible to easily perform a water supply operation of supplying the urea water to the urea water tank 22 and a maintenance operation of the urea water tank 22 and the urea water pump 25.

Further, the urea water tank 22 is arranged to be adjacent to the partition plate 21 as partition between the heat exchanger upstream room 20 and the cab 16. The urea water pump 25 is mounted to the partition plate 21 to be positioned in the upper side to the urea water tank 22. That is, the urea water pump 25 is arranged near the urea water tank 22. As a result, since a length dimension of the return conduit line 30 can be shortened as much as possible, it is possible to efficiently return the urea water in the return conduit line 30 back to the urea water tank 22.

Further, the suction conduit line 27 and the return conduit line 30 are arranged to be adjacent to each other, and the suction conduit line 27 and the return conduit line 30 are together fixed to the partition plate 21 using the clamps 28. Thereby, the suction conduit line 27 and the return conduit line 30 can be efficiently fixed to the partition plate 21 using the clamps 28. In addition, since it is possible to reduce the numbers of components in a case of fixing the suction conduit line 27 and the return conduit line 30 to the partition plate 21, the costs can be reduced. Further, since the suction conduit line 27 and the return conduit line 30 are disposed along the partition plate 21, it is possible to perform the maintenance operation of the heat exchanger 15, the urea water tank 22, the urea water pump 25 and the like without interruption of the suction conduit line 27 and the return conduit line 30.

It should be noted that the aforementioned embodiment is explained by taking a case where the urea water tank 22 and the urea water pump 25 are disposed in the heat exchanger upstream room 20, as an example. However, the present invention is not limited thereto, and, for example, in a state where the urea water pump is arranged in an upper side to the urea water tank on the revolving frame 5 other than the heat exchanger upstream room 20, the return conduit line may be disposed in the upper-lower direction between the urea water pump and the urea water tank.

In addition, the aforementioned embodiment is explained by taking a case where the urea water tank 22 is arranged to be adjacent to the partition plate 21 and the urea water pump 25 is mounted to the partition plate 21 to be positioned in the upper side to the urea water tank 22, as an example. However, the present invention is not limited thereto, and, for example, the urea water tank may be arranged in the counterweight side and the urea water pump may be arranged in the upper side to the urea water tank.

The aforementioned embodiment is explained by taking the wheel type hydraulic excavator 1 of a small revolving type as a construction machine, as an example. However, the present invention is not limited thereto, and may be applied widely to other construction machines such as a crawler type hydraulic excavator and a hydraulic crane. Further, the present invention may be applied to a hybrid type construction machine with an engine and an electric motor.

DESCRIPTION OF REFERENCE NUMERALS

1: Hydraulic excavator (Construction machine)
2: Lower traveling structure (Vehicle body)
3: Upper revolving structure (Vehicle body)
4: Front device
5: Revolving frame (Support structure)
6: Counterweight
7: Engine
7A: Exhaust pipe
8: Cooling fan
10: Exhaust gas purifying device
13A: Urea selective reduction catalyst
14: Urea water injection valve
15: Heat exchanger
16: Cab
20: Heat exchanger upstream room
21: Partition plate
22: Urea water tank
25: Urea water pump
27: Suction conduit line
28: Clamp
29: Supply conduit line
30: Return conduit line

The invention claimed is:

1. A construction machine comprising:
an automotive vehicle body on which a front device is provided;
an engine that is mounted on said vehicle body;
an exhaust gas purifying device that is provided in an exhaust pipe of said engine with a urea selective reduction catalyst removing nitrogen oxides in an exhaust gas;
a urea water injection valve that injects urea water as a reducing agent to an upstream side of said urea selective reduction catalyst;
a urea water tank that reserves therein the urea water to be supplied to said urea water injection valve;
a urea water pump that delivers the urea water reserved in said urea water tank to said urea water injection valve;
a suction conduit line that is provided for connection between said urea water tank and said urea water pump and in which the urea water to be suctioned from said urea water tank toward said urea water pump flows;
a return conduit line that is provided for connection between said urea water pump and said urea water tank and in which the urea water to be returned from said urea water pump toward said urea water tank flows; and
a supply conduit line that is provided for connection between said urea water pump and said urea water injection valve and in which the urea water to be delivered from said urea water pump toward said urea water injection valve flows, wherein
said vehicle body comprises:
an automotive lower traveling structure; and
an upper revolving structure that is mounted on said lower traveling structure to be capable of revolving thereon, and
said upper revolving structure comprises:
a revolving frame that is formed as a support structure for being mounted on said lower traveling structure, said front device being mounted on a front side of said support structure;
a counterweight that is provided in a rear end of said revolving frame for acting as a weight balance to said front device;
said engine that is positioned in the front side to said counterweight and is mounted in a horizontal state extending in a left-to-right direction in a rear part of said revolving frame;
a cooling fan that is arranged in one side in a left-to-right direction of said engine and suctions external air as cooling air;
a heat exchanger that is arranged to face said cooling fan to be positioned in an upstream side in a flow direction of the cooling air by said cooling fan;
a heat exchanger upstream room that is provided upstream of said heat exchanger in the flow direction of the cooling air supplied to said heat exchanger; and
a cab provided in one side in a left-to-right direction across said front device in a front side of said revolving frame, wherein a partition plate is vertically disposed on said revolving frame for partition between said heat exchanger upstream room and said cab, said urea water tank is positioned in said heat exchanger upstream room and is provided on said revolving frame, and is arranged to be adjacent to said partition plate, and said urea water pump is positioned in an upper side to said urea water tank in said heat exchanger upstream room and is mounted to said partition plate, and said return conduit line is disposed in an upper-to-lower direction between said urea water pump and said urea water tank.

2. The construction machine according to claim 1, wherein said suction conduit line and said return conduit line are arranged to be adjacent to each other, and said suction conduit line and said return conduit line are together fixed to said partition plate using a clamp.

\* \* \* \* \*